US012582053B2

(12) United States Patent
Griffin et al.

(10) Patent No.: US 12,582,053 B2
(45) Date of Patent: Mar. 24, 2026

(54) MODULAR RAISED GARDEN BED SYSTEM AND METHOD

(71) Applicant: GRO-RITE GARDEN GLOBAL LLC, Shelby, NC (US)

(72) Inventors: Jonathan Thomas Griffin, Gastonia, NC (US); Justin Reece Lane, Shelby, NC (US); Brian Thomas Unites, Shelby, NC (US)

(73) Assignee: GRO-RITE GARDEN GLOBAL LLC, Shelby, NC (US)

( * ) Notice: Subject to any disclaimer, the term of this patent is extended or adjusted under 35 U.S.C. 154(b) by 174 days.

(21) Appl. No.: 18/423,748

(22) Filed: Jan. 26, 2024

(65) Prior Publication Data

US 2025/0241250 A1      Jul. 31, 2025

(51) Int. Cl.
*A01G 9/28*                (2018.01)
(52) U.S. Cl.
CPC ..................................... *A01G 9/28* (2018.02)
(58) Field of Classification Search
CPC . A01G 9/28; A01G 9/026; B65D 7/12; B65D 7/24; B65D 7/30; A47B 47/0066; E04F 13/0842; E04C 2/08; E04C 2/32; E04B 2/721
See application file for complete search history.

(56) References Cited

U.S. PATENT DOCUMENTS

| | | | | | |
|---|---|---|---|---|---|
| 1,031,713 | A | * | 7/1912 | Hills | A01G 9/026 47/73 |
| 1,049,837 | A | * | 1/1913 | Flatau | B65D 7/24 220/678 |
| 1,133,072 | A | * | 3/1915 | Vanstrom | B65D 7/24 220/4.34 |
| 1,690,261 | A | * | 11/1928 | Wendle | B65D 7/24 220/4.09 |
| 1,886,690 | A | * | 11/1932 | Janssen | A01G 9/026 47/73 |
| 2,219,690 | A | * | 10/1940 | Leydecker | A01G 23/046 47/76 |
| 3,279,043 | A | * | 10/1966 | Wirt | E04C 2/326 D5/1 |
| 3,471,192 | A | * | 10/1969 | Childs | A01G 23/046 47/73 |
| 6,904,715 | B1 | * | 6/2005 | Lawton | A01G 9/026 47/66.3 |

(Continued)

*Primary Examiner* — Gisele D Ford
(74) *Attorney, Agent, or Firm* — ALLEN, DYER, DOPPELT + GILCHRIST, P.A.

(57)                ABSTRACT

A modular raised garden bed system includes a plurality of panels having a first end and an opposing second end. Each panel has a series of apertures aligned proximate to the first end, and a series of U-shaped brackets aligned proximate to the opposing second end. The system includes a plurality of stakes, where each stake is configured to slide through a respective series of U-shaped brackets. The series of U-shaped brackets are configured to be inserted through a respective series of apertures of an adjacent panel, and the stakes are configured to be slid through the series of U-shaped brackets to secure the first ends of the panels to the second ends of the adjacent panels to define a raised garden bed. The panels comprise side panels and corner panels, where the corner panels are curved and configured to define each corner of the raised garden bed.

19 Claims, 4 Drawing Sheets

(56) References Cited

U.S. PATENT DOCUMENTS

|  |  |  |  |  |
|---|---|---|---|---|
| 8,904,706 | B1 | 12/2014 | Smith |  |
| 9,510,518 | B2 | 12/2016 | Shein et al. |  |
| 10,064,344 | B1 | 9/2018 | Meyer |  |
| 10,568,276 | B1 | 2/2020 | Fakhari |  |
| 11,712,007 | B2 * | 8/2023 | Merani | A01G 9/28 |
|  |  |  |  | 52/102 |
| 2005/0081437 | A1 | 4/2005 | Heinemann |  |
| 2007/0000923 | A1 * | 1/2007 | Chen | B65D 19/06 |
|  |  |  |  | 220/4.33 |
| 2008/0092442 | A1 | 4/2008 | Singer |  |
| 2008/0120905 | A1 | 5/2008 | Pai |  |
| 2008/0129165 | A1 * | 6/2008 | Chen | A47B 47/02 |
|  |  |  |  | 312/263 |
| 2010/0192460 | A1 * | 8/2010 | Hart | A01G 9/28 |
|  |  |  |  | 47/65.5 |
| 2010/0242357 | A1 | 9/2010 | Vogler et al. |  |
| 2010/0313474 | A1 | 12/2010 | Williams |  |
| 2011/0203175 | A1 | 8/2011 | Horito et al. |  |
| 2012/0311927 | A1 * | 12/2012 | Bolin | A01G 9/28 |
|  |  |  |  | 47/33 |
| 2014/0283448 | A1 | 9/2014 | Harris |  |
| 2020/0337248 | A1 * | 10/2020 | Munt, III | A01G 9/026 |
| 2022/0095551 | A1 * | 3/2022 | Merani | A01G 9/28 |
| 2023/0116445 | A1 * | 4/2023 | Xiong | A01G 9/28 |
|  |  |  |  | 47/33 |

* cited by examiner

MODULAR RAISED GARDEN BED SYSTEM AND METHOD

FIELD OF THE INVENTION

The present invention relates to raised garden beds and more particularly to a modular raised garden bed system and related methods.

BACKGROUND

A raised garden bed is a gardening structure elevated above the ground. The raised garden bed can provide better drainage, soil control and easier access for planting and maintenance. There are various types of raised garden beds. For example, there are raised garden beds constructed of wood planks, metal, concrete block, stones, plastics, or even straw bales. However, a shortcoming of the existing raised garden beds is the difficulty and effort required in constructing and maintaining.

Accordingly, there is a need to further develop raised garden beds that are easy to construct while extending the durability of the raised garden bed.

SUMMARY

A modular raised garden bed system is disclosed. The system includes a plurality of panels having a first end and an opposing second end, where each panel has a series of apertures aligned proximate to the first end, and a series of U-shaped brackets aligned proximate to the opposing second end. The system also includes a plurality of stakes, where each stake is configured to slide through a respective series of U-shaped brackets. The series of U-shaped brackets are configured to be inserted through a respective series of apertures of an adjacent panel, and the plurality of stakes are configured to be slid through the series of U-shaped brackets to secure the first ends of the panels to the second ends of the adjacent panels to define a raised garden bed. The plurality of panels comprise a plurality of side panels and a plurality of corner panels, where the corner panels are curved and configured to define each corner of the raised garden bed. The plurality of side panels are configured to be joined to the plurality of corner panels to form a contiguous border of the raised garden bed.

In addition, the plurality of panels may be corrugated and comprise steel having a coating of aluminum, zinc, and silicon. The panels may also comprise a non-metallic material. The series of apertures may be punched into the respective panel, and the plurality of U-shaped brackets may be pressed into the respective panel.

In another aspect a modular raised garden bed is disclosed and includes a plurality of panels connected together to define a contiguous border of a raised garden bed, where each of the panels have a series of apertures that are aligned proximate to a respective first end, and a series of U-shaped brackets that are aligned proximate to an opposing second end. A respective series of U-shaped brackets are inserted through a respective series of apertures of an adjacent panel, and a stake is slid through the respective series of U-shaped brackets to secure the first end of the panel to the second end of the adjacent panel.

In yet another aspect, a method of fabricating a raised garden bed system is disclosed. The method includes providing a plurality of panels, wherein each of the panels has a series of apertures aligned proximate to a respective first end, and a series of U-shaped brackets aligned proximate to the opposing second end. The method also includes inserting a respective series of U-shaped brackets through a respective series of apertures of an adjacent side or corner panel. In addition, the method includes sliding a stake through the respective series of U-shaped brackets to secure the first ends of the side and corner panels to the second ends of the adjacent side and corner panels to form a contiguous border of a raised garden bed.

BRIEF DESCRIPTION OF THE DRAWINGS

The above objects, as well as additional objects, features and advantages of the present invention, will be more fully appreciated by reference to the following illustrative and non-limiting detailed description of embodiments of the present invention, when taken in conjunction with the accompanying drawings, wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
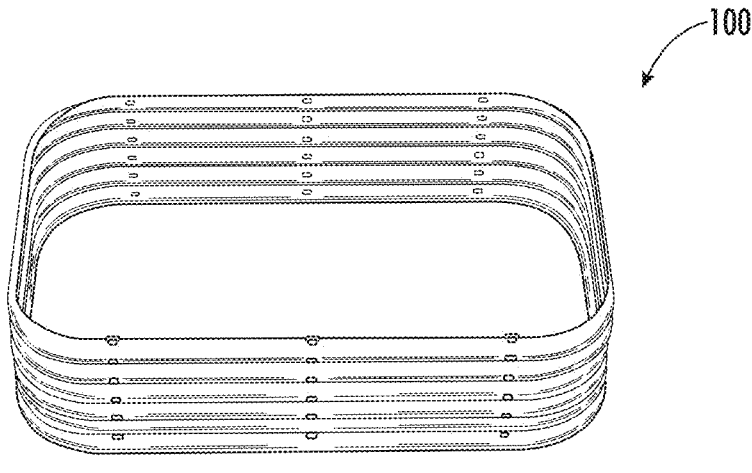
FIG. 1 is a perspective view of a modular raised garden bed system in which various aspects of the disclosure may be implemented.

Referring now to FIG. 1, a perspective view of a modular raised garden bed system of the present invention is shown and generally designated 100. The raised garden bed 100 is installed on a ground surface and filled with soil. Various plants can be grown in the raised garden bed.

The raised garden bed 100 is shown configured into a rectangular shape. However, the raised garden bed 100 can be any number of shapes and dimensions as described below because of its modularity. Accordingly, the rectangular shape and height is not intended to be limiting but rather exemplary. For example, the dimensions of the raised garden bed may be four feet in width, six feet in length, and one and half feet in height.

Figure 2:
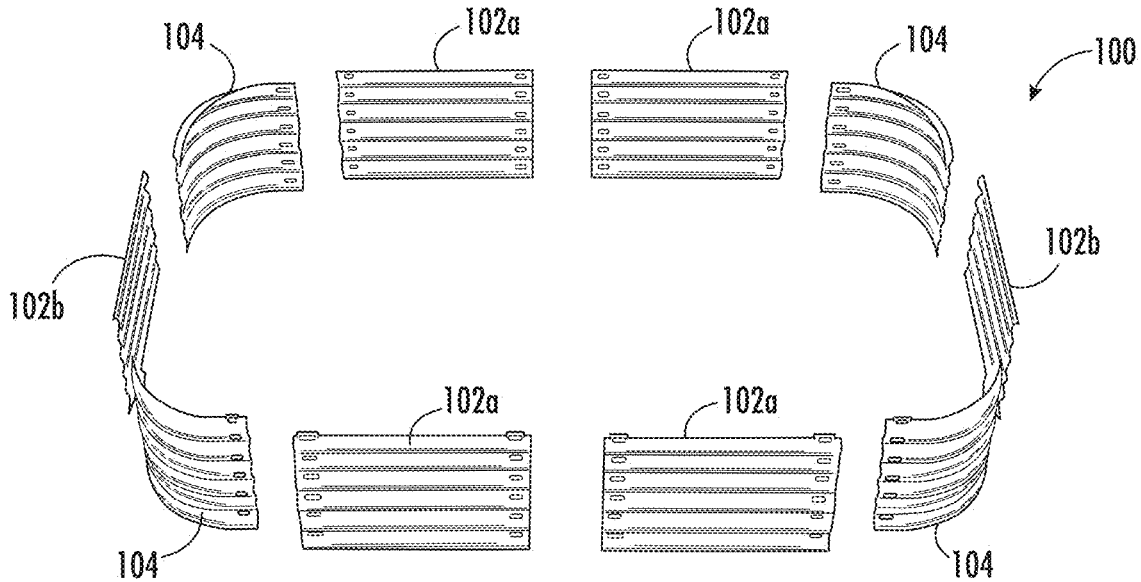
FIG. 2 is an exploded perspective view of the modular raised garden bed system of FIG. 1.

The modularity of the raised garden bed system 100 is due to the uniformity of the elements. For example, as shown in FIG. 2, the raised garden bed 100 has two panels 102a along each side, and one panel 102b at each end. The panels 102a along each side are designated side panels, and the panels 102*b* at each end are designated end panels but are the same construction and dimensions as the side panels 102*a*. Corner panels 104 are used to connect the side panels 102*a* to the end panels 102*b*. The corner panels 104 also have a similar construction and dimensions of the side and end panels 102*a*, 102*b* but are curved approximately ninety degrees. The corner panels 104 may also have different degrees of curvature and the corner panels 104 as shown herein is intended to be exemplary rather than limiting.

Figure 3:
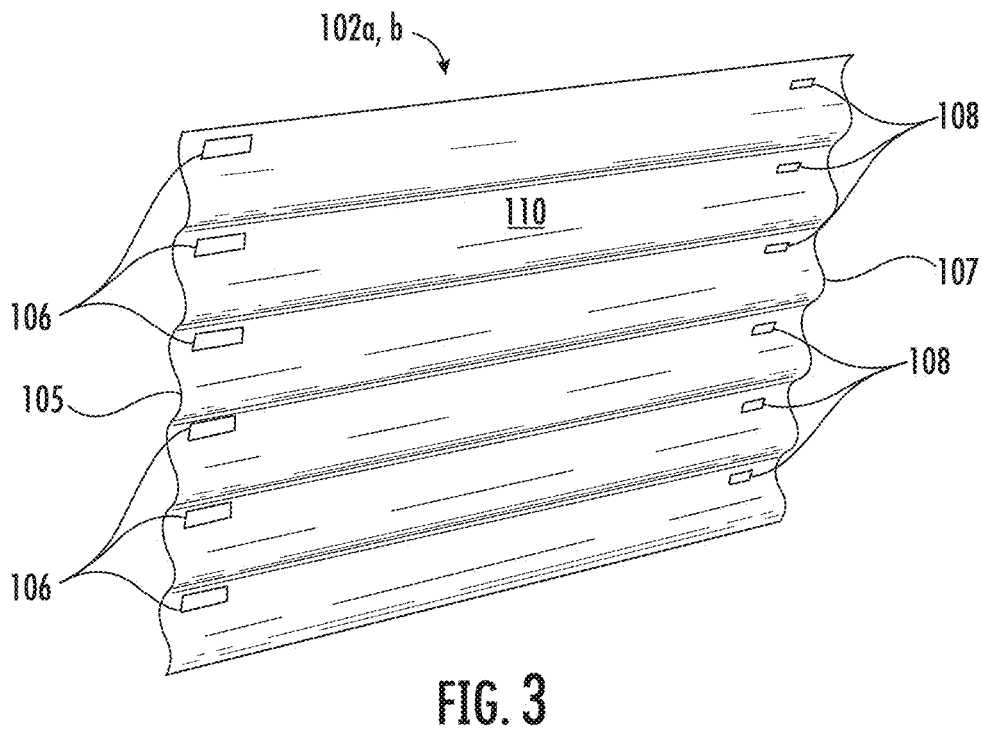
FIG. 3 is a perspective outside view of a side panel of the modular raised garden bed system of FIG. 1.
Figure 4:
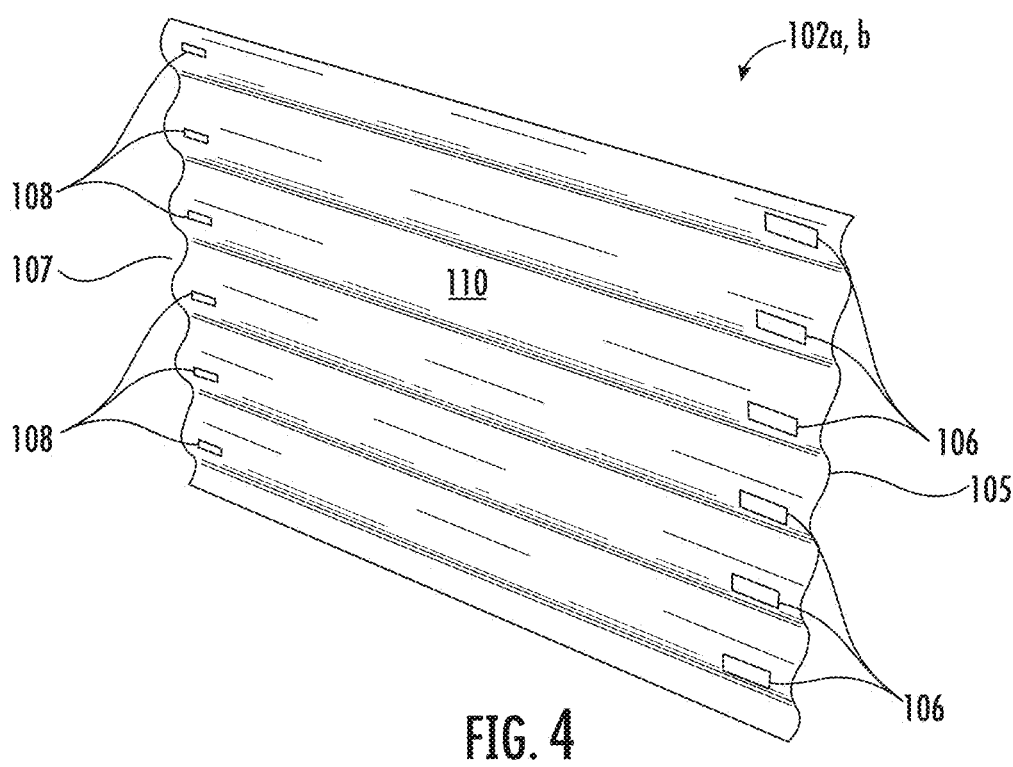
FIG. 4 is a perspective inside view of the side panel of FIG. 3.

Referring now to FIGS. 3 and 4, an exemplary side and end panel 102*a*, 102*b* is shown. The body 110 of the panel 102*a*, 102*b* may be corrugated metal or non-metallic such as plastic. For example, the body 110 may be comprise steel having a coating of aluminum, zinc, and silicon.

The panel 102*a*, 102*b* have a first end 105 and an opposing second end 107, where each panel 102*a*, 102*b* includes a series of apertures 106 aligned proximate to the first end 105, and a series of U-shaped brackets 108 aligned proximate to the opposing second end 107, The U-shaped brackets 108 are positioned and sized to be inserted through a respective series of apertures 108 of an adjacent panel 102*a*, 102*b*. The series of apertures 108 may be punched into the respective panel, and the U-shaped brackets may be pressed into the respective panel.

As described below in more detail, a stake can then be slid through the series of U-shaped brackets 108 to secure the first ends 105 of the panels 102*a*, 102*b* to the second ends 107 of the adjacent panels to define the raised garden bed 100.

Figure 5:
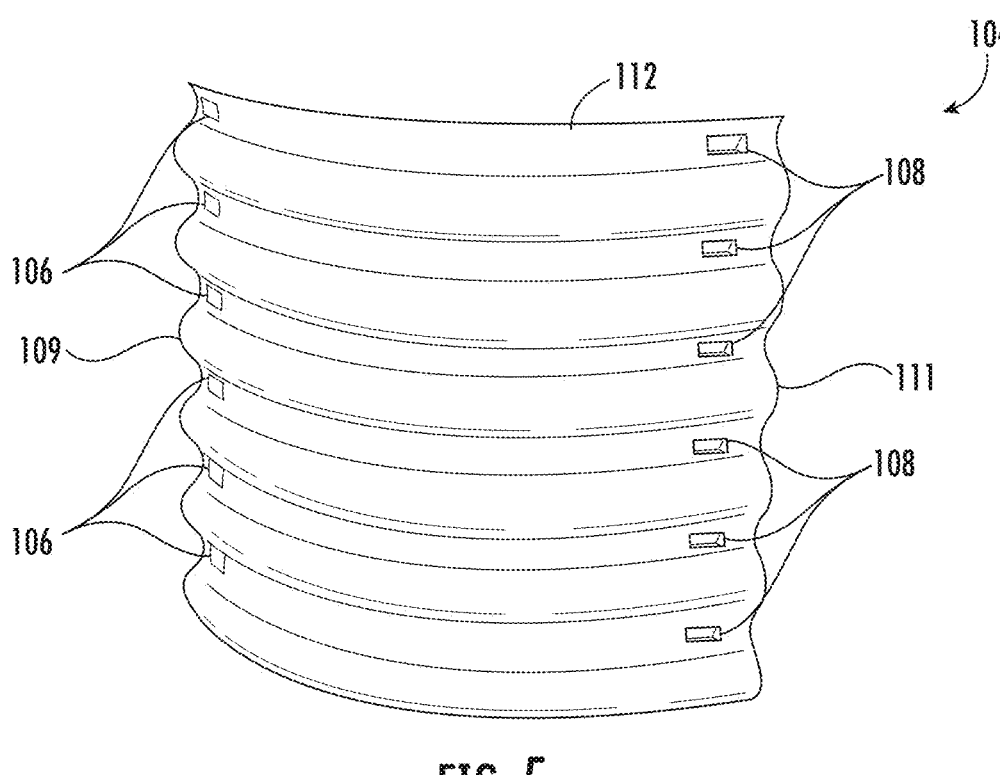
FIG. 5 is a perspective outside view of a corner panel of the modular raised garden bed system of FIG. 1.
Figure 6:
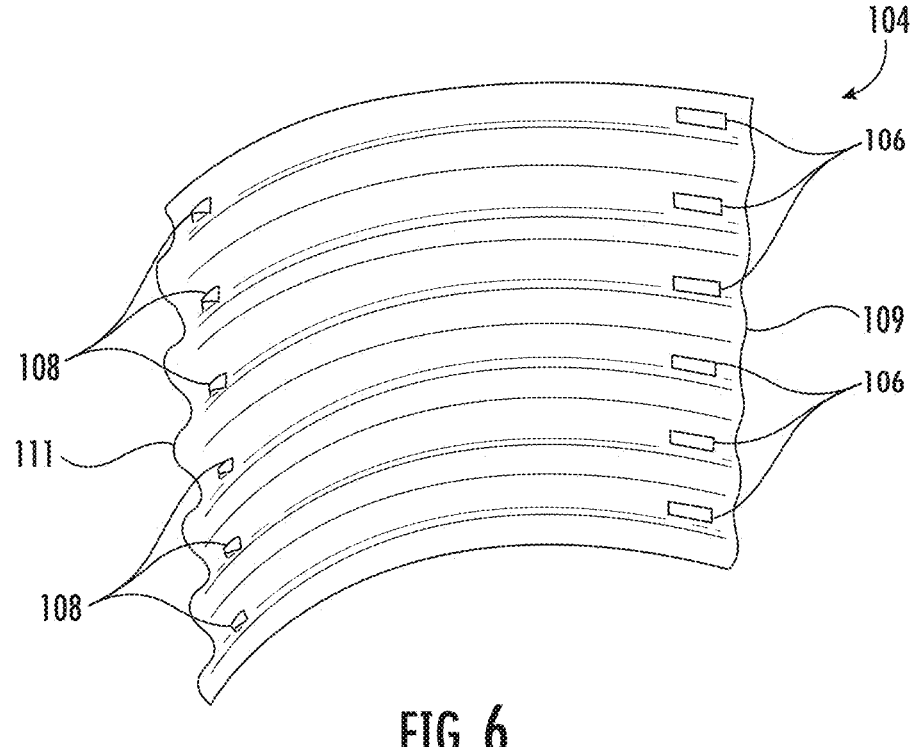
FIG. 6 is a perspective inside view of the corner panel of FIG. 5.

The side panels 102*a* and the end panels 102*b* are relatively straight pieces, whereas the corner panels 104 are curved as shown in FIGS. 5 and 6. The corner panels 104 have a similar construction to the side and end panels 102*a*, 102*b* in that they have a first end 109 and an opposing second end 111. Each corner panel 104 includes the series of apertures 108 aligned proximate to the first end 109, and the series of U-shaped brackets 108 aligned proximate to the opposing second end 111. The U-shaped brackets 108 are positioned and sized to be inserted through a respective series of apertures 108 of the adjacent side panel 102*a* or end panel 102*b*.

Figure 7:
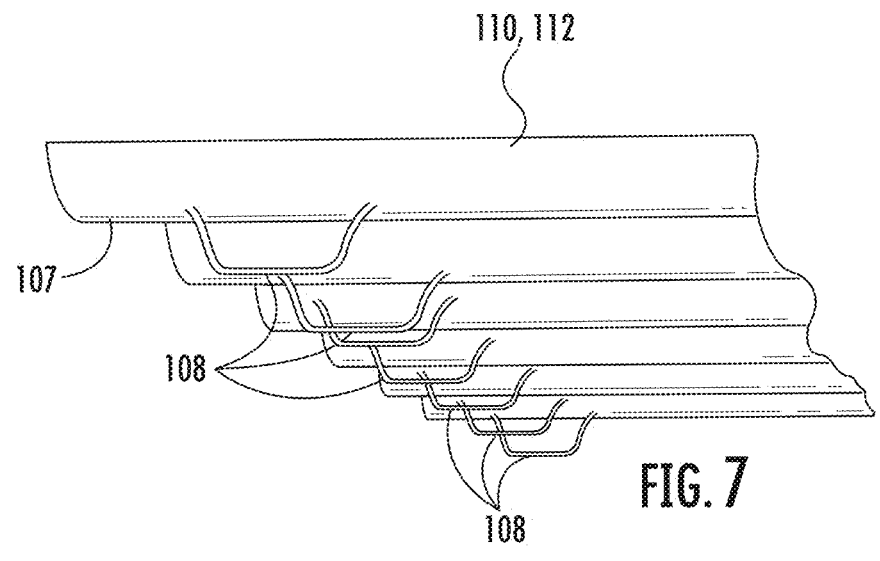
FIG. 7 is a detail view of a series of U-shaped brackets of the side and corner panels.
Figure 8:
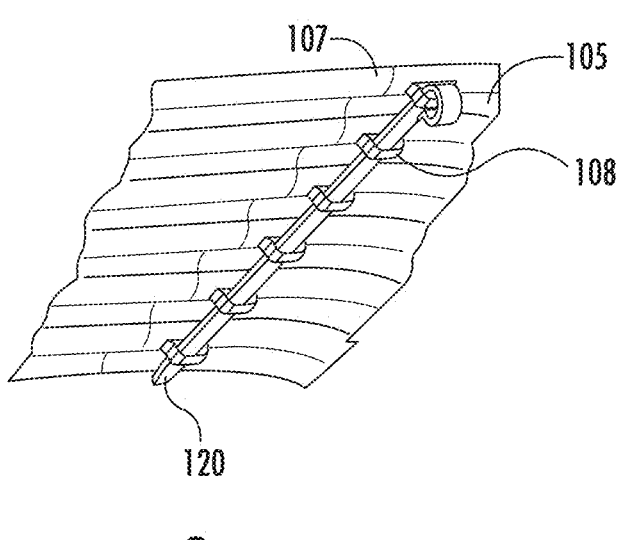
FIG. 8 is perspective view of a stake slid through a series of U-shaped brackets to secure a first end of a panel to a second end of an adjacent panel.
Figures 9, 10:
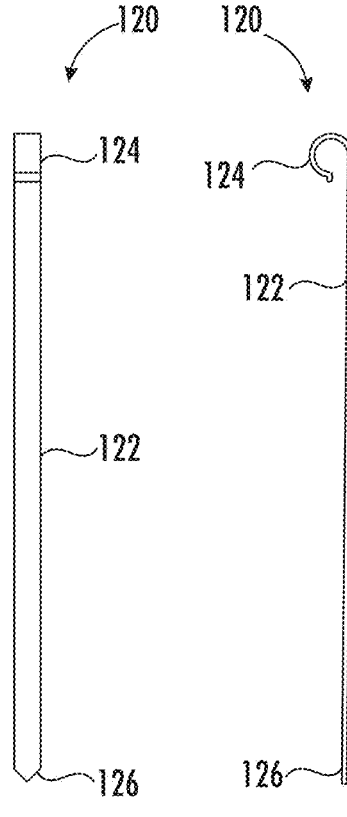
FIG. 9 is a front view of the stake of FIG. 8.
FIG. 10 is a side view of the stake of FIG. 9.

Referring now to FIG. 7, a detail view of the U-shaped brackets 108 is shown. The U-shaped brackets 108 may have different shapes such as being round or rectangular as those of ordinary skill in the art can appreciate. The stake 120 is shown inserted through the series of U-shaped brackets 108 in FIG. 9 in order to secure the second end 107 of the panel over the first end 105. The stake 120 is shown in FIGS. 9 and 10. The stake 120 includes a shaft 122 having a curled top end 124 that is configured to curl over the top of the uppermost U-shaped bracket 108 on the respective panel. The bottom end 126 of the stake is tapered and configured to be pounded into a ground surface and secured. As an example, the raised garden bed 100 of FIG. 1 has three stakes 120 along each side, and two stakes at each end for a total of ten stakes 120 to form the raised garden bed 100.

In yet another aspect, a method of fabricating the modular raised garden bed system 100 described above is disclosed. The method includes providing a plurality of panels 102*a*, 102*b*, 104, where each of the panels has a series of apertures 106 aligned proximate to a respective first end, and a series of U-shaped brackets 108 aligned proximate to the opposing second end. The method also includes inserting the series of U-shaped brackets 108 through a respective series of apertures 106 of an adjacent side 102*a*, 102*b* or corner panel 104. In addition, the method includes sliding a stake 120 through the respective series of U-shaped brackets 108 to secure the first ends of the side 102*a*, 102*b* and corner panels 104 to the second ends of the adjacent side and corner panels to form a contiguous border of the raised garden bed 110.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A modular raised garden bed system, the system comprising:
   a plurality of panels having a first end and an opposing second end, each panel having a series of apertures aligned proximate to the first end, and a series of U-shaped brackets aligned proximate to the opposing second end; and
   a plurality of stakes, each stake configured to slide through a respective series of U-shaped brackets,
   wherein the series of U-shaped brackets of the second end of a first one of the panels are positioned and sized to be inserted through a respective series of apertures of the first end of an adjacent panel so that the second end of the first panel overlaps the first end of the adjacent panel, and the plurality of stakes are configured to be slid through the series of U-shaped brackets to secure the first ends of the panels to the second ends of the adjacent panels to define a raised garden bed.

2. The modular raised garden bed system of claim 1, wherein the plurality of panels comprises a plurality of side panels and a plurality of corner panels.

3. The modular raised garden bed system of claim 2, wherein the plurality of corner panels are curved and configured to define each corner of the raised garden bed.

4. The modular raised garden bed system of claim 3, wherein the plurality of side panels are configured to be joined to the plurality of corner panels to form a contiguous border of the raised garden bed.

5. The modular raised garden bed of claim 1, wherein the plurality of panels are corrugated.

6. The modular raised garden bed of claim 1, wherein the plurality of panels comprise steel having a coating of aluminum, zinc, and silicon.

7. The modular raised garden bed of claim 1, wherein the plurality of panels comprise a non-metallic material.

8. The modular raised garden bed of claim 1, wherein the series of apertures comprise punched apertures formed in the respective panel.

9. The modular raised garden bed of claim 1, wherein the plurality of U-shaped brackets comprise pressed formations in the respective panel.

10. A modular raised garden bed comprising:
    a plurality of panels connected together to define a contiguous border of a raised garden bed, each of the panels have a series of apertures aligned proximate to a respective first end, and a series of U-shaped brackets aligned proximate to an opposing second end; and
    a plurality of stakes;
    wherein a respective series of U-shaped brackets of a second end of a first one of the panels are inserted through a respective series of apertures at the first end of an adjacent panel so that the second end of the first panel overlaps the first end of the adjacent panel, and a respective stake is slid through the respective series of U-shaped brackets to secure the first end of the panel to the second end of the adjacent panel.

11. The modular raised garden bed of claim 10, wherein the plurality of panels are corrugated.

12. The modular raised garden bed of claim 10, wherein the U-shaped bracket is formed on an inside surface of the plurality of panels.

13. The modular raised garden bed of claim 10, wherein the plurality of panels comprise a non-metallic material.

14. The modular raised garden bed of claim 10, wherein the series of apertures comprise punched apertures formed in the respective panel and the plurality of U-shaped brackets comprise pressed formations in the respective panel.

15. A method of fabricating a raised garden bed system, the method comprising:

providing a plurality of panels, wherein each of the panels has a series of apertures aligned proximate to a respective first end, and a series of U-shaped brackets aligned proximate to the opposing second end; and inserting a respective series of U-shaped brackets through a respective series of apertures of an adjacent side or corner panel so that the second end of the panel having the U-shaped brackets overlaps the first end of the adjacent side or corner panel; and sliding a stake through the respective series of U-shaped brackets to secure the first ends of the side and corner panels to the second ends of the adjacent side and corner panels to form a contiguous border of a raised garden bed.

16. The method of claim 15, wherein the plurality of panels comprise side and corner panels.

17. The method of claim 15, wherein the plurality of panels are corrugated.

18. The method of claim 15, wherein the series of U-shaped brackets is formed on an inside surface of the plurality of panels.

19. The method of claim 15, wherein the series of apertures are punched into the respective panel and the plurality of U-shaped brackets are pressed into the respective panel.

\* \* \* \* \*